US010691588B2

(12) United States Patent
Klein

(10) Patent No.: US 10,691,588 B2
(45) Date of Patent: *Jun. 23, 2020

(54) MEMORY SYSTEMS FOR DATA COLLECTION AND COMPRESSION IN A STORAGE DEVICE

(71) Applicant: MICRON TECHNOLOGY, INC., Boise, ID (US)

(72) Inventor: Dean Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/213,318

(22) Filed: Dec. 7, 2018

(65) Prior Publication Data

US 2019/0108121 A1   Apr. 11, 2019

Related U.S. Application Data

(63) Continuation of application No. 15/690,800, filed on Aug. 30, 2017, now Pat. No. 10,176,091, which is a continuation of application No. 12/170,612, filed on Jul. 10, 2008, now Pat. No. 9,772,936.

(51) Int. Cl.
*G06F 12/02* (2006.01)

(52) U.S. Cl.
CPC .. *G06F 12/0246* (2013.01); *G06F 2212/1041* (2013.01); *G06F 2212/401* (2013.01); *G06F 2212/7202* (2013.01)

(58) Field of Classification Search
CPC .. G06F 3/0679; G06F 3/0688; G06F 12/0246; G06F 2212/7205

USPC .......................... 365/185.01–185.33; 711/103
See application file for complete search history.

(56) References Cited

U.S. PATENT DOCUMENTS

| 5,237,460 | A | 8/1993 | Miller et al. |
| 5,337,275 | A | 8/1994 | Garner |
| 5,459,850 | A | 10/1995 | Clay et al. |
| 5,586,285 | A | 12/1996 | Hasbun et al. |

(Continued)

OTHER PUBLICATIONS

European Search Report for EP Application No. 09794961.4, dated Aug. 25, 2011, 7 Pgs.

(Continued)

*Primary Examiner* — Nathan Sadler
(74) *Attorney, Agent, or Firm* — Dicke, Billig & Czaja, PLLC

(57) ABSTRACT

Memory systems may include a storage device comprising a first memory; a processor; and a second memory. The memory systems may be configured to read first data from a first storage location of the first memory, store the first data to a first storage location of the second memory and input the first data to a compression block of the storage device, compress the first data and store the compressed first data to a second storage location of the second memory, evaluate the compressed first data, store the first data from the first storage location of the second memory to a different storage location of the first memory when the compressed first data is not deemed compressible, and combine the compressed first data with additional compressed data and store the combined compressed data to a different storage location of the first memory when the compressed first data is deemed compressible.

20 Claims, 3 Drawing Sheets

(56) References Cited

U.S. PATENT DOCUMENTS

| | | |
|---|---|---|
| 5,802,553 A | 9/1998 | Robinson et al. |
| 5,930,167 A | 7/1999 | Lee et al. |
| 5,943,692 A | 8/1999 | Marberg et al. |
| 6,145,069 A | 11/2000 | Dye |
| 7,111,142 B2 | 9/2006 | Spencer et al. |
| 7,596,657 B2 | 9/2009 | Kaler |
| 9,148,172 B2 | 9/2015 | Manning et al. |
| 10,176,091 B2 * | 1/2019 | Klein .................. G06F 12/0246 |
| 2002/0103960 A1 | 8/2002 | Sinclair |
| 2002/0116424 A1 | 8/2002 | Radermacher et al. |
| 2003/0131184 A1 | 7/2003 | Kever |
| 2004/0250009 A1 | 12/2004 | Chen et al. |
| 2004/0250011 A1 | 12/2004 | Chen et al. |
| 2005/0243626 A1 | 11/2005 | Ronen |
| 2006/0212645 A1 | 9/2006 | Petersen et al. |
| 2007/0005625 A1 | 1/2007 | Lekatsas et al. |
| 2007/0005911 A1 | 1/2007 | Yang et al. |
| 2007/0285980 A1 | 12/2007 | Shimizu et al. |
| 2007/0291571 A1 | 12/2007 | Balasundaram |
| 2008/0005450 A1 | 1/2008 | Bangalore |
| 2008/0025298 A1 | 1/2008 | Lev-Ran et al. |
| 2008/0172525 A1 | 7/2008 | Nakamura et al. |
| 2008/0228998 A1 | 9/2008 | Colecchia et al. |
| 2008/0301256 A1 | 12/2008 | McWilliams et al. |
| 2010/0017578 A1 | 1/2010 | Mansson et al. |
| 2011/0161559 A1 | 6/2011 | Yurzola et al. |

OTHER PUBLICATIONS

European Office Action for EP Application No. 09794961.4, dated Sep. 8, 2014, 6 Pgs.

M. Kjelso, et al. "Memory Management in Flash-Memory Disks with Data Compression", International Workshop IWMM, Sep. 27, 1995, pp. 399-413.

Andrew Birrell, et al. "A Design for High-Performance Flash Disks." Apr. 2007. ACM. ACM SIGOPS Operating Systems Review. vol. 41. pp. 88-93.

Giovanni De Michell "Synthesis and Optimization of Digital Circuits." 1994. McGraw-Hill. pp. 443-455.

David A. Patterson and John L. Hennessy. "Computer Organization and Design." 1998. Morgan Kaufmann. 2nd ed. p. 541.

Websters Online Dictionary. "gzip.".

Eran Gal and Sivan Toledo. "Algorithms and Data Structures for Flash Memories." Jun. 2005. ACM. ACM Computing Surveys. vol. 37. Iss. 2.

Steven Wells and Don Clay. "Flash Solid-State Drive with 6MB/s Read/Write Channel and Data Compression." Feb. 1993. ISSCC '93.

Wen-Tzeng Huang, Chun-Ta Chen, Yen-Sheng Chen and Chin-Hsing Chen. "A Compression Layer for NAND Type Flash Memory Systems." Jul. 2005. IEEE. ICITA 2005.

Keun Soo Yim, Hyokyung Bahn and Kern Koh. "A Flash Compression Layer for SmartMedia Card Systems." Feb. 2004. IEEE. IEEE Transactions on Consumer Electronics. vol. 50. No. 1. pp. 192-197.

* cited by examiner

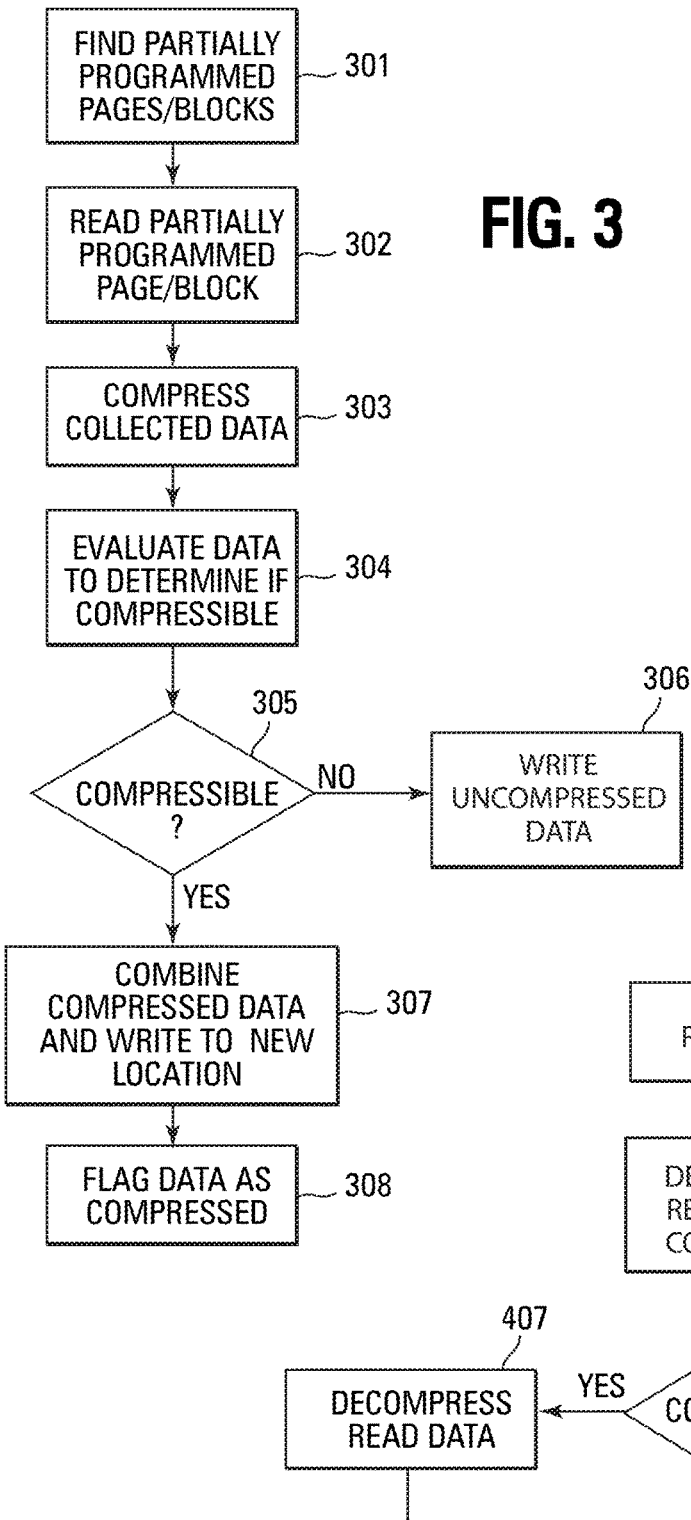

MEMORY SYSTEMS FOR DATA COLLECTION AND COMPRESSION IN A STORAGE DEVICE

RELATED APPLICATION

This Application is a Continuation of U.S. application Ser. No. 15/690,800 titled "METHODS OF OPERATING A STORAGE DEVICE INCLUDING DATA COLLECTION AND COMPRESSION," filed Aug. 30, 2017, now U.S. Pat. No. 10,176,091 issued on Jan. 8, 2019, which is a Continuation of U.S. application Ser. No. 12/170,612 titled "DATA COLLECTION AND COMPRESSION IN A SOLID STATE STORAGE DEVICE," filed Jul. 10, 2008, now U.S. Pat. No. 9,772,936 issued on Sep. 26, 2017, which are commonly assigned and incorporated herein by reference.

TECHNICAL FIELD OF THE INVENTION

The present invention relates generally to memory devices and in a particular embodiment the present invention relates to non-volatile memory devices.

BACKGROUND OF THE INVENTION

Memory devices can include internal, semiconductor, integrated circuits in computers or other electronic devices. There are many different types of memory including random-access memory (RAM), read only memory (ROM), dynamic random access memory (DRAM), static RAM (SRAM), synchronous dynamic RAM (SDRAM), and flash memory.

Flash memory devices have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

One drawback to flash memory devices is that, due to the physical process used to program, they typically only operate properly for a limited quantity of erase/program cycles. Most flash memory devices can operate for 100 k erase/program cycles.

Another drawback is that the cost per bit of storage is relatively high compared to other memory technologies. Thus, the management of the memory cells in a flash memory array needs to be improved to efficiently use as much of the memory array as possible so that memory areas do not go unused.

For the reasons stated above, and for other reasons stated below that will become apparent to those skilled in the art upon reading and understanding the present specification, there is a need in the art for a way to improve non-volatile memory management.

BRIEF DESCRIPTION OF THE DRAWINGS

FIG. 3 shows flowchart of one embodiment of a method for performing a data collection with data compression.

FIG. 4 shows a flowchart of one embodiment of a method for reading compressed data.

DETAILED DESCRIPTION

Figure 1:
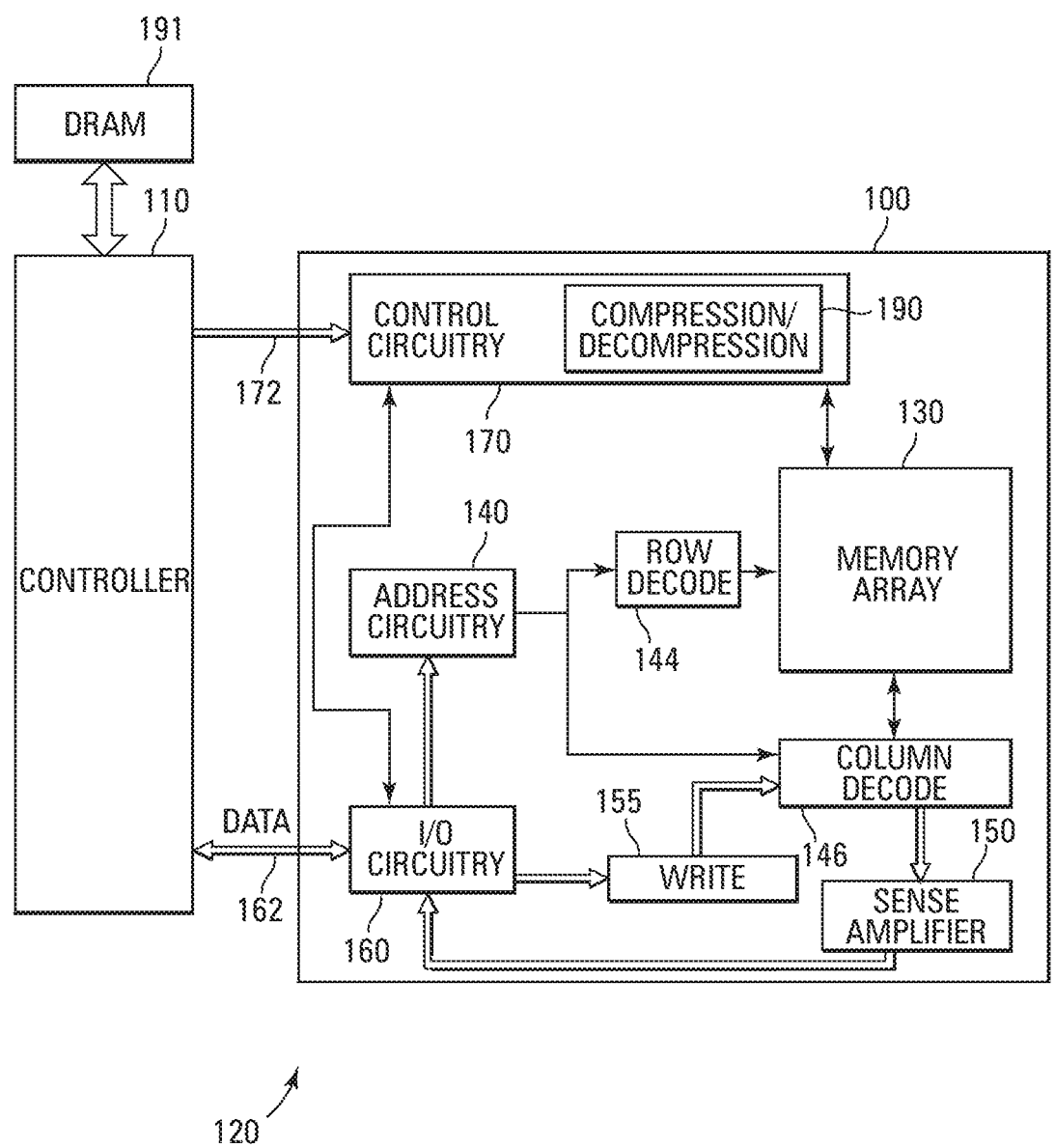
FIG. 1 shows a block diagram of one embodiment of a memory system that incorporates one embodiment of the data collection with data compression method.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates a functional block diagram of a memory system 120 that includes a solid state storage device 100. The solid state storage device 100 can be non-volatile memory 100 such as flash memory. The solid state storage device 100 has been simplified to focus on features of the memory that are helpful in understanding the present programming embodiments. The solid state storage device 100 is coupled to an external system controller 110. The controller 110 may be a microprocessor or some other type of control circuitry.

Figure 2:
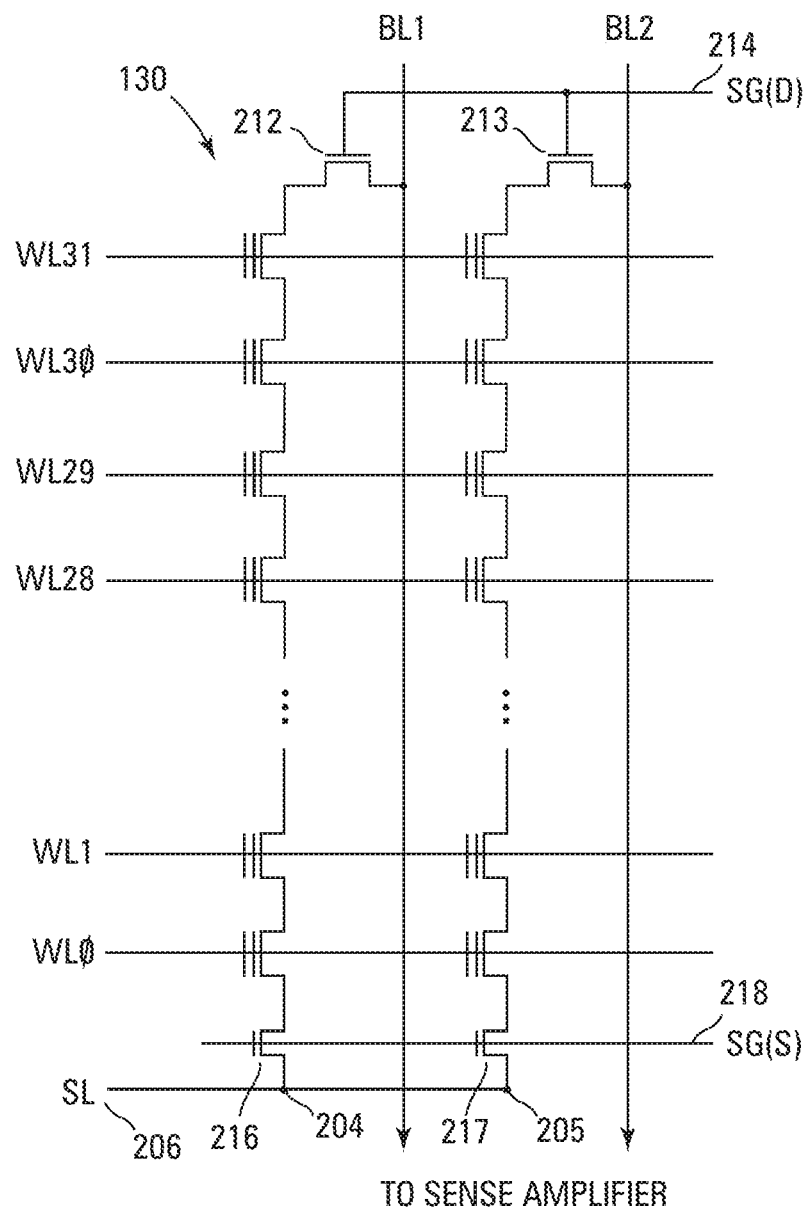
FIG. 2 shows a schematic diagram of one embodiment of a portion of a non-volatile memory array in accordance with the memory array of FIG. 1.

The solid state storage device 100 includes an array 130 of non-volatile memory cells, such as the floating gate memory cells that are illustrated in FIG. 2 and discussed subsequently. The memory array 130 is arranged in banks of access lines such as word line rows and data lines such as bit line columns. In one embodiment, the columns of the memory array 130 are comprised of series strings of memory cells. As is well known in the art, the connections of the cells to the bit lines determines whether the array is a NAND architecture, an AND architecture, or a NOR architecture.

The memory array 130 can be organized into memory blocks. The quantity of memory blocks is typically determined by the size of the memory device (i.e., 512 MB, 1 GB). In one embodiment, each memory block is formed by 64 pages of memory cells. Each page is typically comprised of 2048 bytes of data.

Memory control circuitry 170 can include/cooperate with a compression/decompression block 190 so that uncompressed data being written to the array 130 can be compressed and compressed data read from the array 130 can be decompressed. The compression/decompression 190 can be accomplished through a hardware circuit that performs these tasks. An alternate embodiment performs the compression/decompression 190 through a firmware routine.

A volatile memory area (e.g., DRAM) 191 is provided to temporarily store data. The volatile memory is used by the controller 110 to temporarily store data to be written to the memory array 130, to temporarily store data read from the memory array, and to store other data used by the memory control circuitry 170. For example, as described subsequently, the compression/decompression block 190 can use the volatile memory 191 to store data.

Address buffer circuitry 140 is provided to latch address signals provided through the I/O circuitry 160. Address signals are received and decoded by a row decoder 144 and a column decoder 146 to access the memory array 130. It will be appreciated by those skilled in the art, with the benefit of the present description, that the number of address input connections depends on the density and architecture of the memory array 130. That is, the number of addresses increases with both increased memory cell counts and increased bank and block counts.

The solid state storage device 100 reads data in the memory array 130 by sensing voltage or current changes in the memory array columns using sense amplifier circuitry 150. The sense amplifier circuitry 150, in one embodiment, is coupled to read and latch a row of data from the memory array 130. Data input and output buffer circuitry 160 is included for bidirectional data communication as well as address communication over a plurality of data connections 162 with the controller 110. Write circuitry 155 is provided to write data to the memory array.

The memory control circuitry 170 decodes signals provided on control connections 172 from the controller 110. These signals are used to control the operations on the memory array 130, including data read, data write (program), and erase operations. The memory control circuitry 170 may be a state machine, a sequencer, or some other type of controller to generate the memory control signals. The control circuitry 170 is configured to perform the data collection operations discussed subsequently. Additionally, if the compression/decompression operations 190 are firmware routines, the memory control circuitry 170 is configured to perform compression/decompression as well as the embodiment of the method of FIG. 3.

FIG. 2 illustrates a schematic diagram of a portion of a NAND architecture memory array 130 comprising series strings of non-volatile memory cells on which the embodiments of the subsequently discussed data collection and compression/decompression can operate. While the subsequent discussions refer to a NAND memory device, the present embodiments are not limited to such an architecture but can be used in other memory device architectures as well.

The memory array is comprised of an array of non-volatile memory cells 130 (e.g., floating gate) arranged in columns such as series strings 204, 205. Each of the cells 130 are coupled drain to source in each series string 204, 205. A word line WL0-WL31 that spans across multiple series strings 204, 205 is connected to the control gates of each memory cell in a row in order to bias the control gates of the memory cells in the row. The bit lines BL1, BL2 are eventually connected to sense amplifiers (not shown) that detect the state of each cell by sensing current on a particular bit line.

Each series string 204, 205 of memory cells is coupled to a source line 206 by a source select gate 216, 217 and to an individual bit line BL1, BL2 by a drain select gate 212, 213. The source select gates 216, 217 are controlled by a source select gate control line SG(S) 218 coupled to their control gates. The drain select gates 212, 213 are controlled by a drain select gate control line SG(D) 214.

Each memory cell can be programmed as a single level cell (SLC) or multilevel cell (MLC). Each cell's threshold voltage ($V_t$) is indicative of the data that is stored in the cell. For example, in an SLC, a $V_t$ of 0.5V might indicate a programmed cell while a $V_t$ of −0.5V might indicate an erased cell. The MLC may have multiple $V_t$ ranges that each indicate a different state. Multilevel cells can take advantage of the analog nature of a traditional flash cell by assigning a bit pattern to a specific voltage range stored on the cell. This technology permits the storage of two or more bits per cell, depending on the quantity of voltage ranges assigned to the cell.

Data compression, also referred to in the art as source coding, is the process of transforming an original string of data into a new string of data that contains the same or substantially the same information as the original string but whose length is reduced. Data compression can be either lossy or lossless.

Lossless data compression retains the same original information while using fewer bits. This type of data compression typically cannot accomplish as much compression as the lossy compression but is used in situations where data loss cannot be tolerated as in program source code. Examples of typical lossless data compression algorithms include Lempel-Ziv (LZ) compression, DEFLATE, PKZIP, and GZIP. The embodiments of the present disclosure are not limited to any one type of compression/decompression.

FIG. 3 illustrates a flowchart of one embodiment of a method for data collection and compression. The data collection operation determines which memory pages and/or memory blocks are only partially programmed 301 with valid data (valid data can be the programmed information that should actually be programmed in that particular page and that has not been moved to another location). This can be accomplished by reading the pages/blocks to determine which are only partially programmed. In another embodiment, the partially programmed pages/blocks can be identified (e.g., flagged) at the time that portions of the data from the page/block is moved. In this embodiment, a bit can be set in a page or block status register that indicates only part of the page/block retains valid data. Later, the read operation only has to read the status bit to find the partially programmed pages/blocks.

Partially programmed memory pages and memory blocks can typically result from three scenarios. One cause of a partially programmed memory page is that not enough write traffic occurs to fill a memory page and the controller writes the data it has so that the storage device can signal completion of the operation to the system. Another cause of partially programmed memory pages is that a piece of data is written to a logical block on the device while that same logical block is already contained in a previously written page. The previously written block is now marked "invalid" by that page now has an empty spot available within it and is a data collection candidate. Finally, a less common scenario is that the system sends a command to the device instructing it to invalidate a logical block. If that logical block is part of a previously filled page, this page now is a data collection candidate.

These operations can leave a page or block only partially programmed with valid data that has not been moved. The data collection provides the opportunity to read the memory contents and make the compression a background task.

The valid data in these partially programmed memory pages/blocks is read out 302. The read data 302 is input to the compression block and simultaneously to the DRAM of the solid state storage device. The data is compressed 303 and temporarily stored in a different region of the DRAM. One of the above-described compression routines can be used or some other compression routine can be used. The compression can be accomplished in either hardware or software.

At the completion of the transfer, the compression is evaluated to determine if the data was compressible 304. If the data is not compressible 305, the uncompressed data is written to the memory pages 306.

If the data is compressible 305, the compressed data is combined with other compressed data to fill a memory page 307. In one embodiment, one memory page might contain two pages worth of data.

The compressed data is flagged as compressed 308 so that when it is read, it can be recognized as compressed data in order to be decompressed. Such a flag can include a bit indication in a separate memory location of the memory array (e.g., DRAM translation tables) or a register that is part of the memory control circuitry. The type of compression associated with the compressed data can also be indicated by a similar bit or multiple bit indication in a memory location/register. In another embodiment, all data being written to the memory array is compressed so that the read operation decompresses all read data.

FIG. 4 illustrates one embodiment of a method for reading data from a solid state storage device. Data is initially read from the memory cells 401. This can be accomplished by reading a digital pattern from each cell in a memory array that operates digitally or determining a threshold voltage for each read memory cell in a memory array that operates in an analog fashion.

It is then determined if the read data had been compressed 403 when written or if the data is already in an uncompressed format. As previously discussed, it might be assumed that all read data is in a compressed format, thus requiring decompression for all read data, or a compression indication bit needs to be read for the associated data. In one embodiment, it can also be determined the type of compression algorithm used so that the same decompression algorithm can be used during decompression.

If the data has been compressed 405, it is then decompressed 407, in accordance with the compression algorithm used to compress it, and the decompressed data transferred to the requesting routine 411. If the data had been stored in an uncompressed state 405, the read data is transferred in the same form that it was read 411.

CONCLUSION

In summary, one or more embodiments perform a data collection by reading the valid data remaining in partially programmed memory blocks and groups the valid data together, compresses it, and stores it in a new memory block such that the new memory block is filled. The partially programmed block is then erased and returned for future use. This rewriting of valid data is typically referred to as write amplification since the amount of writing actually occurring is amplified when compared to the amount of original data being written into the memory device. The resulting increased memory capacity reduces the write amplification by spreading out the wear-leveling performed by the memory control circuitry.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A memory system, comprising:
   a storage device comprising a first memory and a compression block;
   a processor external to the storage device; and
   a second memory external to the storage device;
   wherein the memory system is configured to:
      read first data from a first storage location of the first memory;
      store the first data to a first storage location of the second memory and input the first data to the compression block;
      compress the first data and store the compressed first data to a second storage location of the second memory;
      evaluate the compressed first data to determine if it is deemed compressible;
      store the first data from the first storage location of the second memory to a different storage location of the first memory when the compressed first data is determined to not be deemed compressible; and
      combine the compressed first data with additional compressed data and store the combined compressed data to a different storage location of the first memory when the compressed first data is determined to be deemed compressible.

2. The memory system of claim 1, wherein the memory system being configured to read the first data from the first storage location of the first memory comprises the memory system being configured to read the first data from a partially programmed memory page of the first memory.

3. The memory system of claim 2, wherein the memory system being configured to store the combined compressed data to a different storage location of the first memory comprises the memory system being configured to store the combined compressed data to a different memory page of the first memory.

4. The memory system of claim 1, further comprising the memory system being configured to identify the combined compressed data as being compressed in the different storage location of the first memory.

5. The memory system of claim 4, wherein the memory system being configured to identify the combined compressed data as being compressed comprises the memory system being configured to set a bit of the different storage location.

6. The memory system of claim 4, further comprising the memory system being configured to identify a type of compression algorithm used in compressing the combined compressed data.

7. The memory system of claim 1, further comprising the memory system being configured to erase the first storage location of the first memory after reading the first data.

8. The memory system of claim 1, further comprising the memory system being configured to:
   read the combined compressed data from the different storage location of the first memory; and
   decompress the read data.

9. The memory system of claim 8, further comprising the memory system being configured to determine if the read data is compressed prior to decompressing the read data.

10. The memory system of claim 1, further comprising the memory system being configured to:
    determine that the first storage location of the first memory is only partially programmed with valid data prior to reading the first data;
    determine that at least one additional storage location of the first memory is only partially programmed with valid data;
    read second data from the at least one additional storage location of the first memory; and compress the second data to generate the additional compressed data.

11. The memory system of claim 10, wherein the memory system being configured to determine that the first storage location of the first memory is only partially programmed with valid data comprises reading a status bit of the first storage location.

12. A memory system, comprising:
a storage device comprising a non-volatile memory and a compression block;
a processor external to the storage device; and
a volatile memory external to the storage device;
wherein the memory system is configured to:
read first data from a first memory page of the non-volatile memory;
store the first data to a first storage location of the volatile memory and input the first data to the compression block;
compress the first data and store the compressed first data to a second storage location of the volatile memory;
evaluate the compressed first data to determine if it is deemed compressible;
store the first data from the first storage location of the volatile memory to a different memory page of the non-volatile memory when the compressed first data is determined to not be deemed compressible; and
combine the compressed first data with additional compressed data and store the combined compressed data to a different memory page of the non-volatile memory when the compressed first data is determined to be deemed compressible.

13. The memory system of claim 12, wherein the memory system being configured to read the first data from the first memory page of the non-volatile memory comprises the memory system being configured to read the first data from a partially programmed memory page of the first memory.

14. The memory system of claim 12, further comprising the memory system being configured to store an identifier indicating that the combined compressed data has been compressed.

15. The memory system of claim 14, further comprising the memory system being configured to store an identifier indicating a type of compression algorithm used to generate the combined compressed data.

16. The memory system of claim 12, further comprising the memory system being configured to:
read the combined compressed data from the different memory page of the non-memory; and
decompress the read data.

17. The memory system of claim 16, further comprising the memory system being configured to determine if the read data is compressed prior to decompressing the read data.

18. A memory system, comprising:
a storage device comprising a non-volatile memory and a compression block;
a processor external to the storage device; and
a volatile memory external to the storage device;
wherein, for each storage location of a plurality of storage locations of the non-volatile memory, the memory system is configured to:
read respective valid data from that storage location;
store the respective valid data to a respective first storage location of the volatile memory and input the respective valid data to the compression block;
compress the respective valid data and store the compressed respective valid data to a respective second storage location of the volatile memory;
evaluate the compressed respective valid data to determine if it is deemed compressible;
store the respective valid data for that storage location of the non-volatile memory from its respective first storage location of the volatile memory to a different storage location of the non-volatile memory when the compressed respective valid data is determined to not be deemed compressible; and
combine the compressed respective valid data for that storage location of the non-volatile memory with compressed respective valid data of a different storage location of the plurality of storage locations of the non-volatile memory whose compressed respective valid data was determined to be deemed compressible, and store the combined compressed data to a different storage location of the non-volatile memory when the compressed respective valid data for that storage location of the non-volatile memory is determined to be deemed compressible.

19. The memory system of claim 18, further comprising the memory system being configured to determine that each storage location of the plurality of storage locations of the non-volatile memory is only partially programmed with valid data prior to reading the respective valid data from those storage locations.

20. The memory system of claim 19, wherein the memory system being configured to determine that each storage location of the plurality of storage locations of the non-volatile memory is only partially programmed with valid data comprises the memory system being configured to read a status bit of each of those storage locations.

* * * * *

UNITED STATES PATENT AND TRADEMARK OFFICE
CERTIFICATE OF CORRECTION

PATENT NO. : 10,691,588 B2  
APPLICATION NO. : 16/213318  
DATED : June 23, 2020  
INVENTOR(S) : Klein Page 1 of 1

It is certified that error appears in the above-identified patent and that said Letters Patent is hereby corrected as shown below:

In the Claims

Column 7, Line 49, Claim 16, delete "the non-memory" and insert in place thereof --the non-volatile memory--.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*